United States Patent [19]
Bice

[11] 3,982,319

[45] Sept. 28, 1976

[54] METHOD FOR CONNECTING A TAP ASSEMBLY TO AN ENERGIZED HIGH-VOLTAGE CABLE

[75] Inventor: Charles D. Bice, Pittsburgh, Pa.

[73] Assignee: Westinghouse Electric Corporation, Pittsburgh, Pa.

[22] Filed: Jan. 10, 1975

[21] Appl. No.: 540,205

[52] U.S. Cl................................. 29/628; 174/71 R; 174/73 R; 174/92; 339/97 R; 339/266 L
[51] Int. Cl.²...................... H02G 1/14; H01R 7/04; H01R 7/20
[58] Field of Search............... 174/71 R, 71 C, 72 R, 174/73 R, 73 SC, 92, 93; 339/97 R, 97 P, 98, 143 C, 263 R, 263 L, 265 R, 265 F, 266 R, 266 L; 29/628

[56] References Cited
UNITED STATES PATENTS

| 416,143 | 11/1889 | Wesslau | 174/92 X |
|---|---|---|---|
| 3,457,428 | 7/1969 | Perry | 339/97 R X |
| 3,461,419 | 8/1969 | Link | 174/71 C X |
| 3,826,860 | 7/1974 | DeSio et al. | 174/73 SC |
| 3,848,955 | 11/1974 | Lockie et al. | 339/97 R |

FOREIGN PATENTS OR APPLICATIONS

| 193,454 | 11/1957 | Austria | 174/71 R |
|---|---|---|---|
| 1,198,435 | 8/1965 | Germany | 339/98 |

*Primary Examiner*—Laramie E. Askin
*Attorney, Agent, or Firm*—D. R. Lackey

[57] ABSTRACT

A cable tap assembly for connecting a tapping concentric cable to a high-voltage energized concentric cable. The tap assembly includes a two-piece housing having openings through which the cables extend. The tapped cable extends through two of the openings, and the tapping cable extends through a third opening. A fourth opening in the housing permits access for engaging a clamping assembly with the center conductor of the tapped cable. The clamping assembly includes two hinged members having knife contacts thereon. When the hinged members are forced together, the knife contacts pierce the insulation and make contact with the center conductor of the tapped cable. The tapping cable is electrically connected to the clamping assembly. A liquid insulating material is injected into the housing and allowed to solidify. The housing and the clamping assembly may first be positioned around the grounded portion of the tapped cable and then moved over to a prepared ungrounded portion of the tapped cable. When in position, the clamping means is tightened to make contact with the center conductor.

2 Claims, 4 Drawing Figures

3,982,319

METHOD FOR CONNECTING A TAP ASSEMBLY TO AN ENERGIZED HIGH-VOLTAGE CABLE

BACKGROUND OF THE INVENTION

1. Field of the Invention

This invention relates, in general, to cable connectors and, more specifically, to tap assemblies for connection to energized high-voltage concentric cables.

2. Description of the Prior Art

Cable connectors for high-voltage concentric electrical cables are used to connect a lead or "tapping" cable to the high-voltage "tapped" cable. Normally, such connectors are associated with underground electrical power distribution systems and are applied to the primary cable usually for the purpose of connecting a transformer to the primary cable.

Because of the high voltages involved and because of the insulation systems required for underground operation, the arrangement of a "hot" tap connector which is to be applied to the tapped cable while is is energized must be specifically constructed for this type of application. Cable taps designed for connection to non-energized cables or to cables energized with a relatively low voltage are not suitable for tapping energized high-voltage electrical cables because the required preparation and tap adjustments cannot be made safely when the cable is energized.

The tapping operation of energized electrical cables requires the use of long insulated tools to provide a large safety margin for the workmen. Usually, these are awkward to work with and some particular operations are practically impossible to perform at the end of a "hotstick." Therefore, it is desirable, and it is an object of this invention, to provide a cable tap connector which may be installed with a minimum of work involving long insulated tools.

Many prior art cable taps for non-energized cables require removal of the insulation around the center conductor before the cable tap can be connected. Other prior art arrangements do not require removal of the insulation but pierce the insulation and the center conductor. Piercing the center conductor can damage the center conductor and may fail to provide the necessary pressure between the center conductor and the piercing member. A few prior art connectors, such as that disclosed in U.S. Pat. No. 3,380,014, substantially pierce the insulation but not the center conductor. While the apparatus disclosed in the referenced patent is much different than that of the present invention, the basic principle of piercing the insulation without substantially piercing the conductor within the insulation is highly desirable for use in tapping high-voltage concentric energized cables. Therefore, it is also desirable, and it is another object of this invention, to provide a cable tap which is suitable for use in tapping energized high-voltage concentric cables without piercing the center conductor of the cable.

SUMMARY OF THE INVENTION

There is disclosed herein a new and useful cable tap assembly suitable for connecting a concentric cable to a high-voltage concentric cable while energized, and a method for applying the disclosed tap assembly. A semiconductive housing surrounds a clamping assembly with an insulating material filling the region between the housing and the clamping asembly. The housing contains two openings through which extends the energized cable which is to be tapped. The tapping cable is electrically connected to a clamping assembly which is positioned around the inner conductor of the tapped cable and the associated insulation around the inner conductor.

The clamping assembly includes top and bottom portions which are pivotally attached to each other on one side of the tapped cable. A threaded member is attached to the top and bottom portions on the other side of the tapped cable. When the threaded member is rotated, knife contacts contained in channels in the clamping assembly portions pierce the conductor insulation and make electrical contact with the center conductor. Additional openings in the housing permit entrance of the tapping cable and of the tool required to rotate the threaded member. The cable openings are sealed with the aid of a semiconductive, elastomeric, tubular seal which is clamped in the openings. The opening which provides access to the threaded member also permits the injection of a liquid insulating material therein which cures to a solid state.

The cable tap is constructed to require a minimum amount of cable preparation and tap adjusting which requires long insulated tools. The majority of the work required to provide the tap may be accomplished by a workman before exposing the energized conductor. The cable to be tapped is first prepared by separating the outer conductor from a portion of the tapped cable. The clamping assembly, with the tapping cable attached thereto, and the housing are placed around the portion of the cable from which the outer conductor was removed. The outer semiconducting jacket around the cable insulation is removed from an adjacent portion of the tapped cable. The housing and the clamping assembly are then moved along the cable until the clamping assembly is positioned over the exposed insulation portion of the cable. The insulating material is injected into the housing and the clamping assembly is forced together to make electrical contact with the inner conductor.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
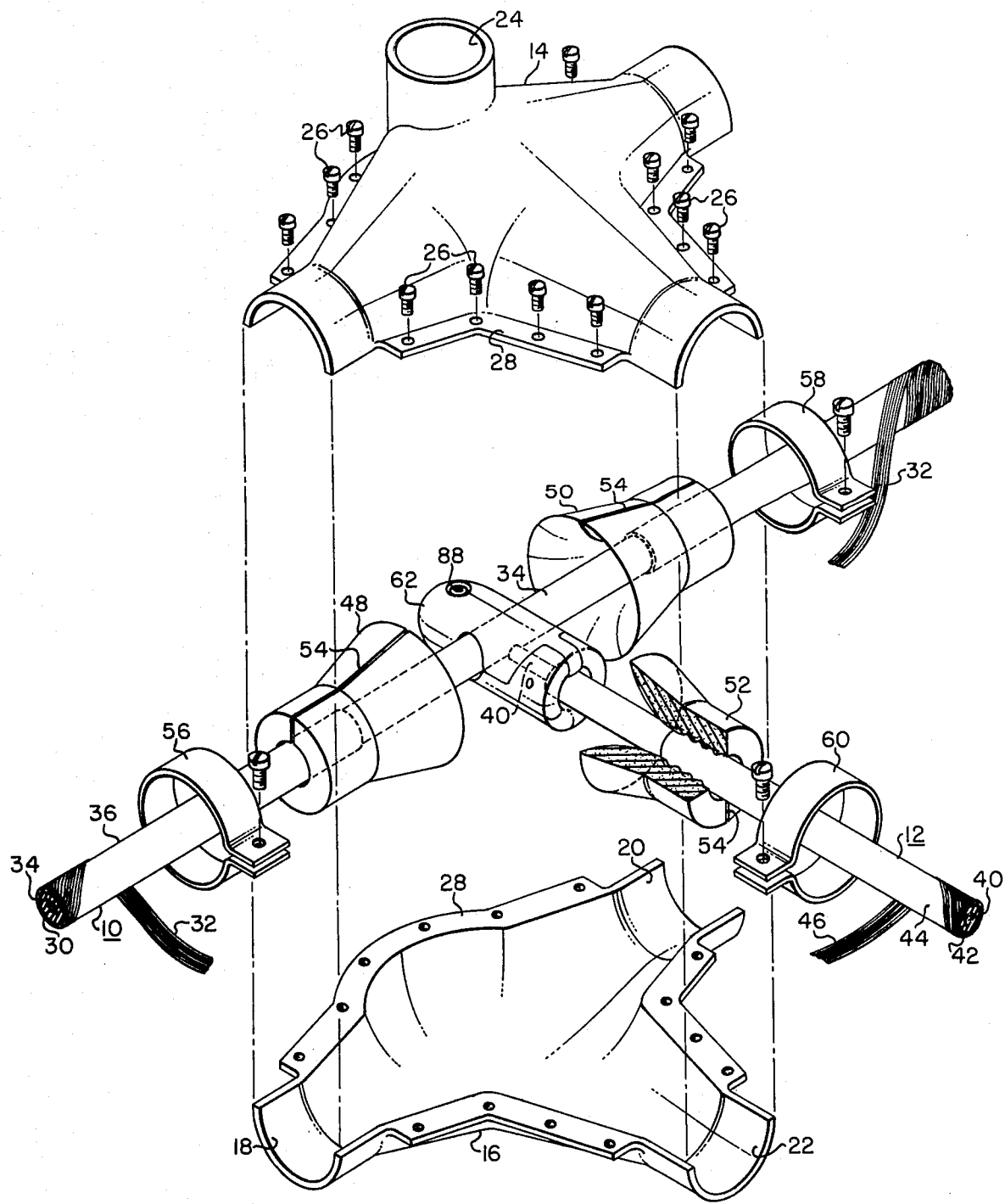
FIG. 1 is an exploded view of a cable tap assembly constructed according to the teachings of this invention.

Throughout the following description, similar reference characters refer to similar elements or members in all of the figures of the drawing.

Referring to the drawing, and to FIG. 1 in particular, there is shown a cable tap constructed according to this invention. The components of the cable tap are indicated at positions along the tapped cable 10 and the tapping cable 12 which they would occupy when the tap is complete. The cable tap includes the upper housing portion 14 and the lower housing portion 16 which are constructed of separate pieces of suitable material to allow convenient placement around the other components of the cable tap. When connected together, the housing portions 14 and 16 combine to form the circular openings 18, 20 and 22 through which the tapped cable 10 and the tapping cable 12 extend. The upper housing portion 14 also includes the circular opening 24 which provides access to the internal components of the cable tap when the housing portions are connected together.

The housing portions 14 and 16 are constructed of a suitable material which provides sufficient component protection and electric field distribution. Although a rigid metallic material may be used for the housing portions 14 and 16, the material in this specific embodiment of the invention includes a butyl elastomeric material which is filled or impregnated with an electrically conductive material to aid in stress distribution between the various components of the cable tap. By using such a material, the housing portions 14 and 16 are substantially resilient and are able to conform to the shape of the various components and materials of the cable tap which are positioned inside the housing portion. Thus, voids between the various materials and components are less likely to be produced during the life of the cable tap, thus reducing the possibility of corona discharges. Although the housing portions 14 and 16 may be connected together with the aid of the bolts 26 as shown in FIG. 1, it is within the contemplation of this invention that other arrangements may be used to secure the housing portions 14 and 16 together. In addition, suitable rigid plates constructed with substantially the same dimensions as the housing portion flanges 28 may be used to maintain the shape of the flanges 28 when the housing portions 14 and 16 are connected together.

The tapped cable 10 includes an inner or center conductor 30, a neutral, ground, or outer conductor 32, insulating material 34 disposed around the inner conductor 30, and a semiconducting jacket or covering 36 which is positioned between the insulating material 34 and the outer conductor 32. High-voltage concentric cables of this type also usually include a semiconducting jacket or covering which surrounds the inner conductor of the cable to help improve the stress distribution in the insulating material. The tapping cable includes a similar arrangement of materials and, in particular, the center conductor 40, the insulating material 42, the semiconducting jacket 44, and the outer conductor 46.

The openings 18, 20 and 22 in the housing portions 14 and 16 are sealed with the aid of the seals 48, 50 and 52, respectively. Each of the seals is constructed of an elastomeric material which contains a high percentage of electically conductive filler to provide sufficient electrical stress distribution. The seals contain slits 54 therein which enable the seals to be spread apart and applied around the corresponding high-voltage cable.

The clamps 56, 58 and 60 are positioned around the opening ends of the cable tap housing portions 14 and 16 to help force the housing portions 14 and 16 tightly against the seals 48, 50 and 52 to completely isolate the internal components of the cable tap from the outside of the cable tap housing portions 14 and 16. The clamping assembly 62 is electrically connected to the center conductor 40 of the tapping cable 12 and the center conductor 30 of the tapped cable 10. The clamping assembly 62 includes contacts which pierce the insulating material 34 to make electrical contact with the center conductor 30.

Figure 2:
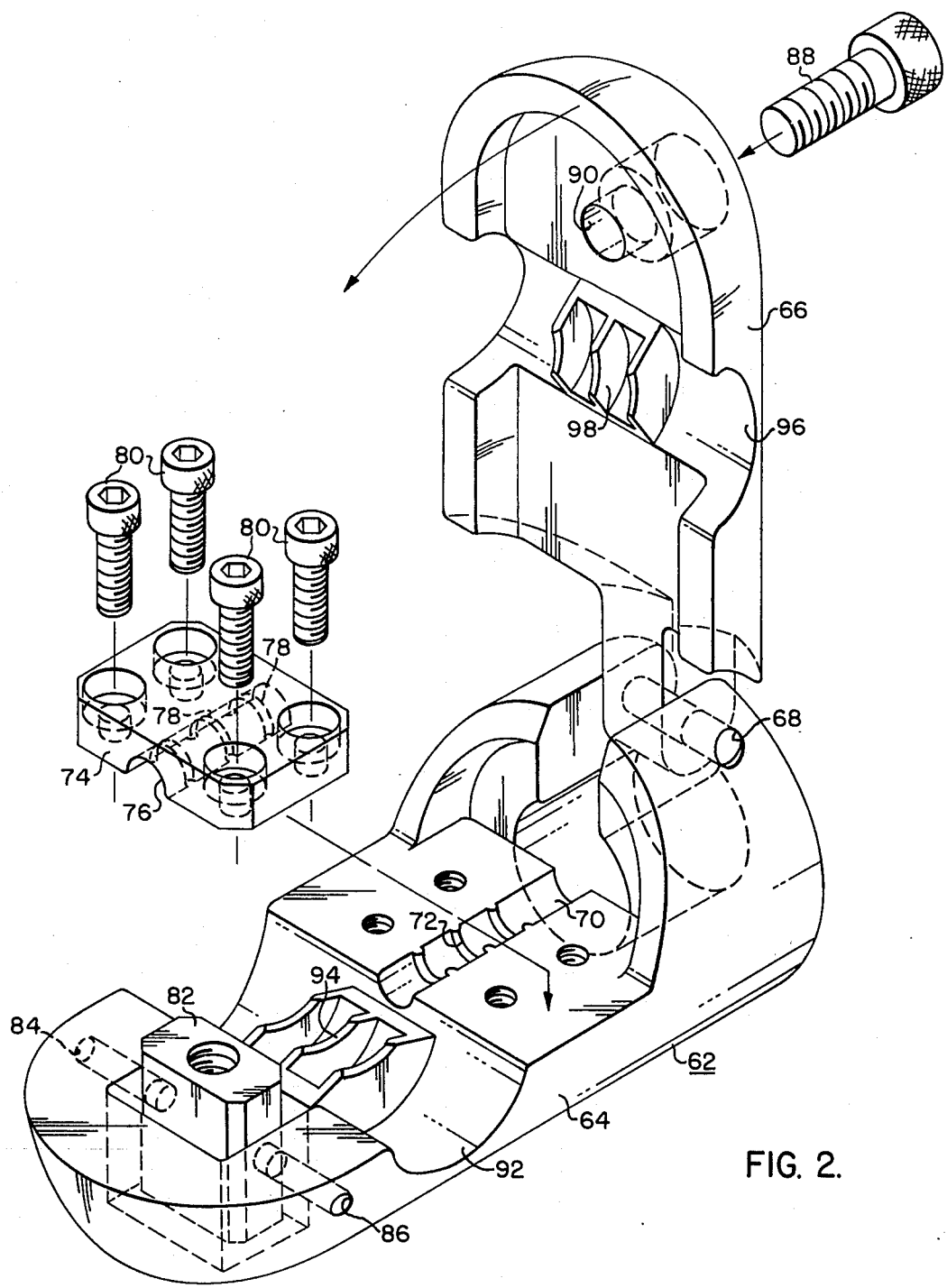
FIG. 2 is an exploded view of the clamping assembly shown in FIG. 1.

FIG. 2 is an exploded view of the clamping assembly 62 illustrating in detail the arrangement and structure of the various components thereof. The bottom portion 64 is pivotally connected to the top portion 66 by the pin 68. Both portions are constructed of a suitable electrical conducting material, such as aluminum. The bottom portion 64 includes the semicircular chanel 70 which contains a plurality of projections 72. The plate 74 also contains a semicircular channel 76 which includes a plurality of projections 78. The plate 74 is fastened to the bottom portion 64 by the bolts 80 when the center conductor of the tapping cable is positioned in the semicircular channel 70. Thus, the projections 72 and 78 push tightly against the inner conductor of the tapping cable and mechanically and electrically connect the tapping cable to the clamping assembly 62.

The bottom portion 64 of the clamping assembly 62 also includes a pivot nut 82 which is connected to the bottom portion 64 by the pins 84 and 86. The bolt 88 is positioned to extend through the opening 90 in the upper portion 66 and engaged with the threads in the pivot nut 82. Thus, when the bolt 88 is sufficiently rotated, the bottom portion 64 and the top portion 66 are tightly pulled together. The bottom portion 64 also includes a semicircular channel 92 which includes a plurality of knife contacts 94 which are sufficiently sharp to penetrate or pierce the insulating material around the center conductor of the tapped cable. Similarly, the top portion 66 includes the semicircular channel 96 and the knife contacts 98.

Figure 3:
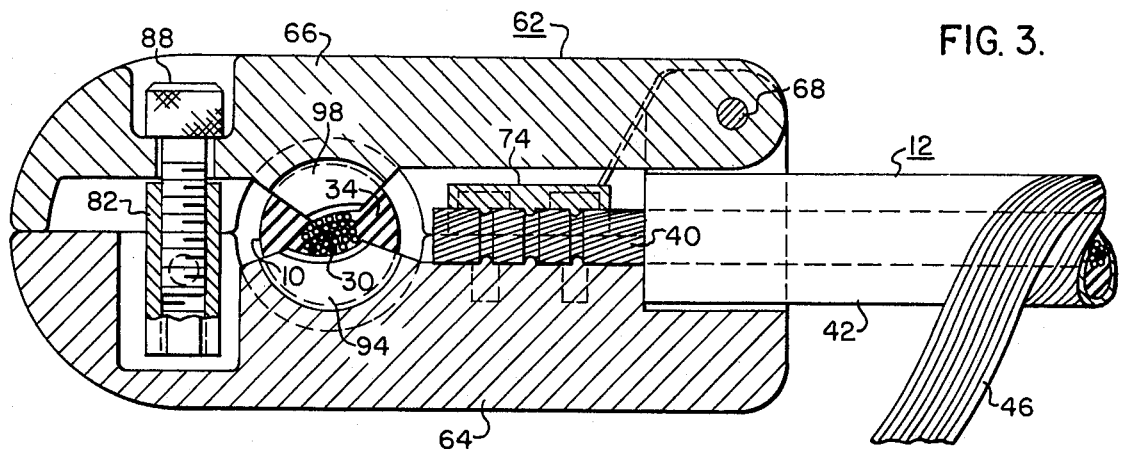
FIG. 3 is a sectional view of the clamping assembly shown in FIG. 1.

FIG. 3 is a cross-sectional view of the clamping assembly 62 appropriately connected to the tapping cable 12 and to the tapped cable 10. The center conductor 40 extends from the insulating material 42 and is secured to the bottom portion 64 by the plate 74. The knife contacts 94 and 98 have pierced the insulating material 34 and are pressing against the inner conductor 30 to make sufficient electrical contact therewith. Thus, a complete electrical path exists between the center conductor 30 and the center conductor 40.

Figure 4:
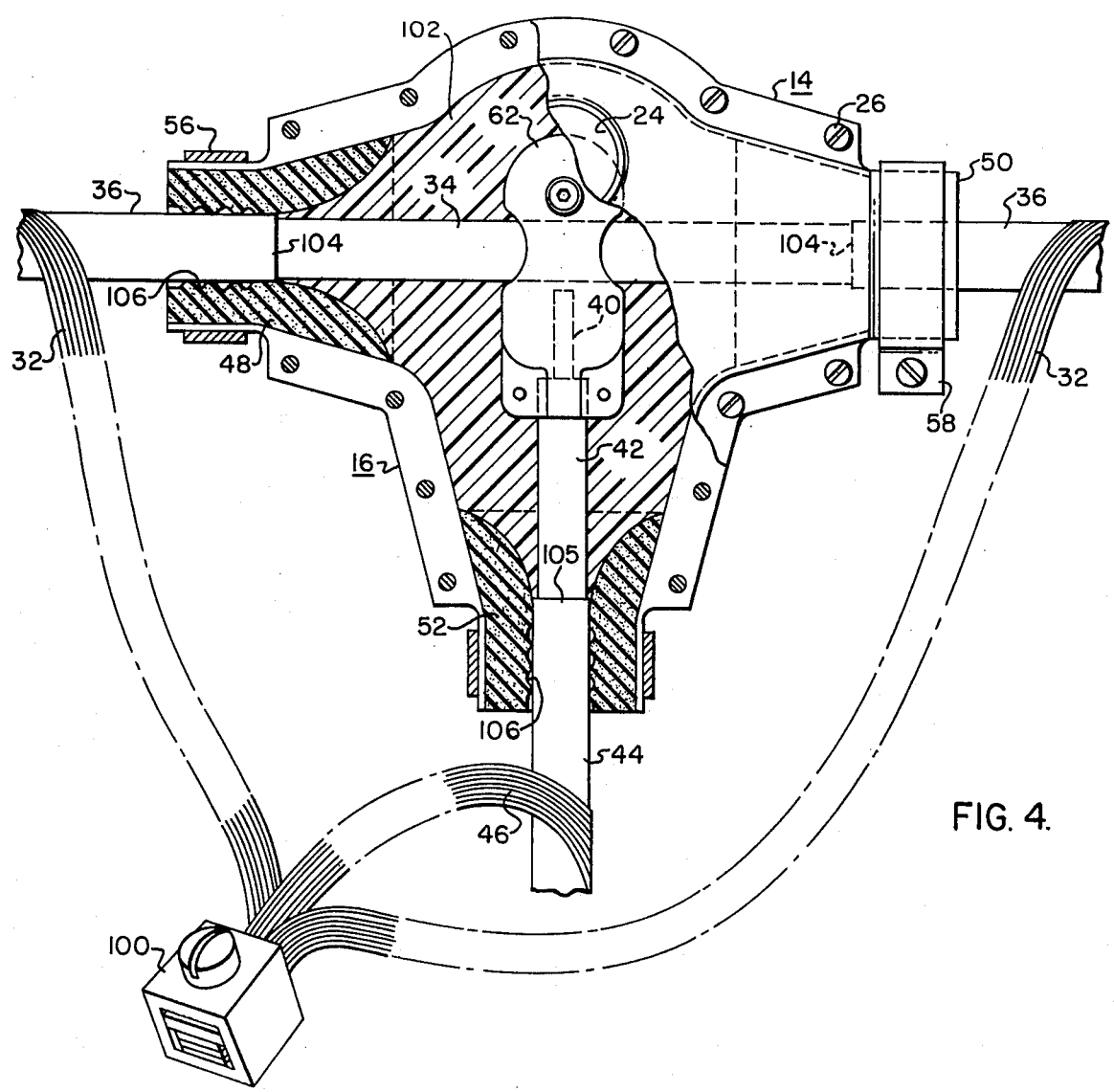
FIG. 4 is a partial, cross-sectional view of a completed cable tap constructed according to this invention.

FIG. 4 is a partial, cross-sectional view of the cable tap assembly after the completion of the tapping process. The outer conductors 32 and 46 of the high-voltage concentric cables are connected together by the terminal block or connector 100. An insulating material or potting insualtion 102 is positioned between the clamping assembly 62 and the housing portions of the cable tap. Preferably, the potting insulation 102 is constructed of a material which can be injected into the housing, through the opening 24, in a liquid state and allowed to cure or solidify when all of the regions within the housing portions have been completely filled.

The semiconducting layers or jackets 36 and 44 of the tapped and tapping cables have been removed to expose a portion of the insulating materials 34 and 42. The ends 104 and 105 of the semiconducting jackets 36 and 44, respectively, are positioned substantially at the position where the seals 48, 50 and 52 contact the tapped and tapping cables. Thus, the electric field between the clamping assembly 62 and the elements at ground potential terminates substantially at the ends 104 and 105 of the tapped and tapping cables respectively. The seals 48, 50 and 52 contain the grooves 106 which help to seal the interface between the seals and the semiconducting jackets. It is important that the potting insulation 102 extends completely to the ends 104 and 105 of the semiconducting jackets to prevent voids which would be highly susceptible to corona discharges.

An alternate arrangement may be used in the regions of the seals 48, 50 and 52 to assure that no voids exist in the potting insulation 102 adjacent to the ends 104 and 105 of the semiconducting jackets. Such an arrangement would require that the ends 104 and 105 of the semiconducting jackets be moved back farther on the concentric cables to a location which would permit the application of a second clamp around the housing portion which compresses each seal. With such an arrangement, the outermost clamps would be tightened until the process of inserting the potting insulation 102 was completed. Then, the innermost clamps would be tightened and the inside surfaces of the seals would be pressed against the insulating materials 34 and 42 of the concentric cables. Sone of the potting insulation 102 would also remain in the region between the ends 104 and 105 of the semiconducting jackets and the sealed area between the seals and the insulating materials 34 and 42. Thus, by effectively squeezing or pressing the seals at a location which is farther inward than the ends of the semiconducting jacket after the potting insulation has been fully inserted, the creation of any voids between any semiconducting member which shapes the electic field within the potting insulating 102 may be eliminated.

The construction of the cable tap assembly disclosed herein permits a very convenient and safe application technique of the tap assembly. In making the cable tap connection, the outer conductor 32 of the tapped cable would be separated from a portion of the tapped cable to expose the semiconducting jacket therearound. The tapping cable 12 would be suitably prepared and connected to the bottom portion of the clamping assembly 62. The clamping assembly 62, the seals 48, 50 and 52, and the housing portions 14 and 16 are positioned over a portion of the tapped cable from which the outer conductor 32 has been removed. Since the semiconducting jacket 36 is still in place along the entire length of the tapped cable at this stage of the tapping process, little danger exists to the workmen in applying the components to the tapped cable without tightening the bolt which forces the knife contacts of the clamping assembly through the insulating material 34. Thus, these steps in the tapping procedure may be performed safely without long insulating rods or tools which are sometimes awkward to work with.

After the cable tap assembly has been positioned around the semiconducting jacket 36, removable of a portion of the semiconducting jacket 36 is accomplished, with the aid of a long insulated tool, on a portion of the tapped cable adjacent to and beside the cable tap assembly. This exposes the insulating material 34 and will later permit the penetration of the knife contacts through the insulation 34 without shorting the inner conductor to the semiconducting jacket 36. After the semiconducting jacket 36 has been removed, the cable tap assembly including the clamping assembly 62 is moved along the cable until the clamping assembly 62 is substantially centered in the region from which the semiconducting jacket 36 was removed. An insulating material is injected into the opening 24 of the housing portion 14 to properly insulate the clamping assembly 62 from the semiconducting components of the cable tap assembly which are at ground potential. When the potting insulation 102 sufficiently fills the interior of the housing assembly, a suitable tool is inserted into the opening 24 to turn the bolt 88 and move the knife contacts together. Thus, the knife contacts penetrate the insulating material 34 and make contact with the inner conductor 30 of the tapped cable 10. Unless an expendable tool is used to rotate the bolt 88, it must be removed from the opening 24 before the potting insulation 102 solidifies. A suitable cap may be placed over the opening 24 to isolate the potting insulation 102 from the surroundings. Therefore, a considerable amount of adjusting and preparation is accomplished before the voltage on the center conductor is applied to the clamping assembly 62.

Since numerous changes may be made in the abovedescribed apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:
1. A method of connecting a concentric tapping cable to an energized high-voltage concentric cable having a semiconductive layer adjacent to the outer conductor of the cable, said method comprising the steps of:
   removing the outer conductor of the energized cable from around the cable insulation and the semiconductive layer;
   attaching the tapping cable to a clamping means and placing the clamping means around a portion of the energized cable from which the outer conductor was removed;
   placing a housng around the cables and the clamping means;
   removing the semiconductive layer from a portion of the energized cable located at the side of the housing and the clamping means;
   sliding the housing and clamping means along the energized cable until the clamping means is positioned over the portion of the cable from which the semiconductive layer and the outer conductor have been removed;
   inserting a tool through an opening in the housing and adjusting the clamping means to provide electrical contact between the inner conductors of the energized and tapping cables; and
   injecting an insulating material into said opening to insulate the clamping means from the housing.
2. The method of claim 1 wherein the insulating material is injected into the housing before the clamping means is adjusted to provide electrical contact.

* * * * *